US008269361B2

(12) United States Patent
Egedal (10) Patent No.: US 8,269,361 B2
(45) Date of Patent: Sep. 18, 2012

(54) ADAPTIVE ADJUSTMENT OF THE BLADE PITCH ANGLE OF A WIND TURBINE

(75) Inventor: Per Egedal, Herning (DK)

(73) Assignee: Siemens Aktiengesellschaft, München (DE)

( * ) Notice: Subject to any disclaimer, the term of this patent is extended or adjusted under 35 U.S.C. 154(b) by 436 days.

(21) Appl. No.: 12/575,617

(22) Filed: Oct. 8, 2009

(65) Prior Publication Data

US 2010/0090464 A1   Apr. 15, 2010

(30) Foreign Application Priority Data

Oct. 10, 2008   (EP) .................................... 08017839

(51) Int. Cl.
*F03D 9/00* (2006.01)
*H02P 9/04* (2006.01)
(52) U.S. Cl. ........................................................ 290/44
(58) Field of Classification Search .................... 290/43, 290/44
See application file for complete search history.

(56) References Cited

U.S. PATENT DOCUMENTS

| 6,840,734 | B2 * | 1/2005 | Hansen | 415/1 |
| 7,101,152 | B2 * | 9/2006 | Wobben | 416/1 |
| 7,484,933 | B2 * | 2/2009 | Wobben | 416/1 |
| 7,571,013 | B2 * | 8/2009 | Altemark | 700/34 |
| 2009/0295159 | A1 * | 12/2009 | Johnson et al. | 290/44 |

FOREIGN PATENT DOCUMENTS

| DE | 10127451 A1 | | 12/2002 |
| DE | 102004056255 A1 | | 6/2006 |
| EP | 1 835 293 | * | 9/2007 |
| WO | WO 0166940 A1 | | 9/2001 |
| WO | WO 2007123552 A1 | | 11/2007 |

* cited by examiner

*Primary Examiner* — Javaid Nasri (57) ABSTRACT

It is described a method of determining a quality of an initial value for a blade pitch angle. An initial power captured by a wind turbine is measured, while the blade pitch angle has the initial value. The blade pitch angle is changed from the initial value to a first value in a first direction. A first power captured by the wind turbine is measured and the blade pitch angle is changed to a second value in a second direction being opposite to the first direction. Further, a second power captured by the wind turbine is measured, a power difference between the first power and the second power is calculated, and the quality of the initial value based on the calculated power difference is determined. Further, a control system, a wind turbine and a computer program are described.

13 Claims, 5 Drawing Sheets

ADAPTIVE ADJUSTMENT OF THE BLADE PITCH ANGLE OF A WIND TURBINE

CROSS REFERENCE TO RELATED APPLICATIONS

This application claims priority of European Patent Office Application No. 08017839.5 EP filed Oct. 10, 2008, which is incorporated by reference herein in its entirety.

FIELD OF INVENTION

The present invention relates to the field of wind turbines for generating electric power. In particular, the present invention relates to a method of determining the quality of an initial value for a blade pitch angle of a wind turbine. Further, the present invention relates to a control system for determining the quality of an initial value for a blade pitch angle of a wind turbine, to a wind turbine and to a computer program for controlling the mentioned blade pitch angle quality determination method.

BACKGROUND OF INVENTION

Wind energy is increasingly recognized as a viable option for complementing and even replacing other types of energy such as fossil fuels. In the early development of wind energy, the majority of wind turbines were constructed for operation at a constant speed. However, recently the trend is toward using variable-speed wind turbines to better capture available wind power. In most cases, wind turbine blade pitch angles can be adjusted to control the operation of the variable speed wind turbine.

Wind turbine manufacturers use variable-speed turbines to capture available wind power over a wide range of wind speeds. To be effective, though, these variable speed wind turbines require active control systems to react to changing wind and other operating conditions. One concept that is fundamental to the control dynamics for a wind generator is that changing speed is a relatively slow process due to the large inertia values involved, and this makes it difficult to use a power converter in the wind turbine or in the electrical power plant of the wind turbine to control the propeller speed. As a result, manufacturers and operators of variable speed wind turbines also use a blade pitch control on an ongoing basis to regulate the power flow at the high speed limit. In other words, a control system is used to vary pitch rapidly in response to propeller speed, and significant efforts have been made to improve this ongoing pitch control system.

The power coefficient Cp for a wind turbine is a measure of the mechanical power delivered by the propeller to a low sped shaft of a wind turbine. Cp is defined as the ratio of the received mechanical power to the power available in the wind.

WO2007123552 discloses an adaptive control method for operating a wind turbine in variable speed conditions in order to adjust the blade pitch angle for better capturing the available wind power. The method includes determining captured power for a period of time for the operating wind turbine. For this period of time, the wind power available is also determined by means of a wind sensor being mounted for instance at the mast of the wind turbine. Then, the power coefficient Cp is determined based on the ratio of captured power to the available wind power. The described adaptive control method continues with generating a blade pitch angle signal for use in setting a blade pitch angle of one or more blades in the wind turbine by modifying an existing blade pitch angle setting by a pitch increment. Then, the captured power Cp and the available wind power are determined for a next or second time period. The power coefficient Cp is determined for this second time period and is compared to the earlier power coefficient. Based on this comparison, the next blade pitch angle signal is generated to set the blades to a new pitch angle that differs from the existing pitch angle by a next or second pitch increment. Specifically, if the power coefficient is increasing (i.e., the second power coefficient is larger than the first power coefficient), a sign of the prior pitch angle increment is retained and a next pitch angle increment is added to the existing blade pitch angle. If the power coefficient is decreasing, then the sign of the pitch angle increment is changed prior to it being added to the existing blade pitch angle for the blades. The process continues with a next power coefficient Cp being determined after another adaptation time period has lapsed and further modifying the blade pitch angle by a pitch angle increment. The known described blade pitch angle adjustment method has the disadvantage that it relies on two completely different measurement processes, i.e. the measurement process for the actual captured power and the measurement of the in principle available wind power. If only one of these measurement processes defective, whole blade pitch angle adjustment method leads to unreasonable results.

SUMMARY OF INVENTION

There may be a need for improving the adjustment procedure of a blade pitch angle more reliably.

This need may be met by the subject matter according to the independent claims. Advantageous embodiments of the present invention are described by the dependent claims.

According to a first aspect of the invention there is provided a method of determining the quality of an initial value for a blade pitch angle of a wind turbine. The provided method comprises (a) measuring an initial power captured by the wind turbine, while the blade pitch angle has the initial value, (b) changing the blade pitch angle from the initial value to a first value by a predetermined first angle change in a first direction, (c) measuring a first power captured by the wind turbine, while the blade pitch angle has the first value, (d) changing the blade pitch angle from the first value to a second value by a predetermined second angle change in a second direction being opposite to the first direction, (e) measuring a second power captured by the wind turbine, while the blade pitch angle has the second value, (f) calculating a power difference between the first power and the second power, and (g) determining the quality of the initial value based on the calculated power difference.

This first aspect of the invention is based on the idea that the quality of an initial blade pitch value can be determined in a reliable way simply by comparing different power values with each other, wherein all these power values have been evaluated by means of experimental measurement processes. By contrast to known methods there is no need to take into account potentially defective or error-prone results from calculations. There is also no need to take into account calculations, which are based on a measurement value having been acquired by a separate measurement procedure. In particular, there is no need for separately measuring the principal available wind power, which in known methods is typically done by means of a free wind detector mounted at a met-mast in front of the wind turbine.

The described quality determining method may be started if the wind turbine is operating below a rated power. Carrying out the described method results in the quality of the initial value, which shows how optimal the initial blade pitch angle is. Since the described power difference between the first and the second power is already a good indicator for the quality of the initial blade pitch angle, the quality of the initial value may also be the same as the calculated power difference. In that case the step of determining the quality of the initial value simply comprises applying the identity function to the calculated power difference. However, also other functions may be applied in the described step of determining the quality, which functions provide for a unique correlation between a quality value representing the quality of the initial value and the power difference or at least of the norm of the power difference.

In the described method relative or absolute values of the blade pitch angle can be used. In particular, relative values of the blade pitch angle, which are given with respect to the initial value of the blade pitch angle, can be used.

According to an embodiment of the invention the method further comprises determining an optimized value for the blade pitch angle based on the initial value and on the calculated power difference. This may provide the advantage that the angular direction, in which the optimized value is located with respect to the initial value can be determined. Specifically, if the power difference is positive, then the optimized value is located for instance in the positive angular direction with respect to the initial value. If the power difference is negative, then the optimized value is located in the opposite, i.e. the negative angular direction with respect to the initial value.

In principle, for determining the angular direction, in which with respect to the initial value the optimized value is located, it would be sufficient to take into account only the sign of the power difference.

It is pointed out that if the power difference is zero, it can be concluded that the initial value already represents the optimum value for the blade pitch angle. Therefore, it should not be possible that a variation in the blade pitch angle leads to a further increase of the power which can be captured by the wind turbine.

According to a further embodiment of the invention determining the optimized value for the blade pitch angle further takes into account (a) a first difference between the first value and the initial value and (b) a second difference between the initial value and the second value. Thereby, the first difference depends on the first angle change. The second difference depends on the first and on the second angle change, because when reversing the sense of rotation the second angle change has in the first instance to compensate for the first angle change before, on an angular scale, with respect to the initial value the second value will be located on the opposite side as the first value.

The described consideration of the first difference and of the second difference may provide the advantage that not only the direction, in which with respect to the initial value the optimized value is located, but also at least the approximate angular position corresponding to the optimized value for the blade pitch angle can be determined by means of a simple inter- or extrapolation with the first and the second value.

According to a further embodiment of the invention the first difference is the same as the second difference. This means that with respect to the initial value of the blade pitch angle on an angular scale (a) the first value of the blade pitch angle and (b) the second value of the blade pitch angle are symmetrical with respect to each other. This may provide the advantage that both the abode described step of determining the quality of the initial value and the step of determining the optimized value for the blade pitch angle can be carried out in a mathematical very simple and, with respect to the precision of the quality value respectively the optimized value, in a highly effective manner.

According to a further embodiment of the invention the method further comprises adjusting the blade pitch angle to the optimized value. This may provide the advantage that the actual captured power can be increased in an efficient manner.

The described adjustment procedure can be carried out repeatedly. In particular, a feedback loop can be established, wherein in case of an unwanted angular shift of the blade pitch angle away from an operating point, the described method can be used in order to readjust the blade pitch angle towards an optimal blade pitch angle.

It is pointed out that also other dimensions can be added to the described adjustment method, which represents a control method. In this context the term "dimension" refers to measurement values, which are indicative for certain environmental conditions and/or for certain operational conditions of the wind turbine. Environmental conditions may be for instance the day time, the solar radiation, the season, the temperature of the surrounding air, etc. Of course, at least some of these measurement values may be dependent from each other. Operational conditions are for instance wind turbine settings being different from the blade pitch angle.

Taking into account these other dimension may mean, that the described adjustment method is carried out separately for different measurement values being related to these dimensions. Thereby, after completing the respective adjustment method the resulting value for the optimized blade pitch angle can be stored for instance into a look up table. If later, the same or at least a similar measurement value being related to the respective dimensions arises, the corresponding blade pitch angle can be retrieved from the look up table and can be taken as a good starting point for again carrying out the described blade pitch angle adjustment method.

According to a further embodiment of the invention the step of determining the optimized value is only carried out, if the calculated power difference is smaller than a predefined threshold. This may provide the advantage that erroneous and/or misleading measurement values of the first and of the second power are automatically rejected. In other words, such values will not cause any further course of action such that the described method will be stopped. Specifically, such erroneous and/or misleading measurement values will not form the basis for the determining of an optimized value and a blade pitch angle adjustment.

It has to be mentioned that a large power difference corresponds to a poor quality of the initial value. This means, that when the power difference is larger than a predefined threshold the quality of the initial value is smaller than a predefined quality threshold.

The described consideration of the predefined threshold may mean, that for the acceptance of the calculated power difference a corridor is established. If the calculated power difference is out of this corridor, the first and/or the second value are considered as to be erroneous and/or misleading.

A large and if applicable a too large power difference can have many different physical reasons. In particular a large power difference can be caused by a change of the surrounding conditions of the wind turbine. In this respect it will be easily understood that for instance a temporal change in the wind speed may cause a too large power difference.

According to a further embodiment of the invention the predefined threshold is a non uniform function of the power captured by the wind turbine. This may provide the advantage that the predefined threshold can be adapted to the current operational condition of the wind turbine. In this respect it will be easily understood that if there is for instance a strong wind, larger wind fluctuation can be expected as compared to a situation, where the wind strength is smaller. Therefore, a certain calculated power difference might be acceptable for further optimizing the blade pitch angle in case the wind strength is comparatively large. By contrast thereto, the certain calculated power difference should be rejected in case the wind strength is comparatively small, because it will probably be based on erroneous and/or misleading measurement values.

According to a further embodiment of the invention (a) measuring the initial power comprises an averaging process within an initial time interval, (b) measuring the first power comprises an averaging process within a first time interval, and/or (c) measuring the second power comprises an averaging process within a second time interval. This may provide the advantage that time dependent fluctuations of the captured power are averaged out. As a consequence, the precision of the initial, the first and/or the second power can be significantly increased. Thereby, the degree of the precision improvement depends on the length of the respective time interval. The longer the time interval is, the better is typically the precision of the respective power. As a consequence, the precision of the determination of the quality, of the determination of the optimized value and/or of the adjustment of the blade pitch angle will be enhanced.

According to the described method the differential power between two measured power values is calculated, which have been obtained within two different time intervals by means of appropriate averaging processes. In between these two time intervals the blade pitch angle is changed a little. Based on the sign and magnitude of the calculated power difference the position of the optimized blade pitch angle can be determined.

According to a further embodiment of the invention the first time interval starts after an elapse of a predetermined first waiting time following an approach of first value and/or the second time interval starts after an elapse of a predetermined second waiting time following an approach of second value. This may provide the advantage that transient power measurement data, which are acquired shortly after the wind turbine blade reaches the corresponding angular position respectively the corresponding angular value, are not taken into account for the respective measurement process. This may significantly improve the averaging process, because measurement data during this time interval would be disturbed or would comprise large fluctuations due to a transient behavior of a dynamic inflow. In practice, a time interval having a duration of for instance 30 seconds is a good compromise between (a) a preferably long duration of the measurement process and (b) a preferably reliable elimination of transient measurement data.

According to a further aspect of the invention there is provided a control system for determining the quality of an initial value for a blade pitch angle of a wind turbine. The control system comprises (a) a data acquisition unit for receiving a measured value of a initial power captured by the wind turbine, while the blade pitch angle has the initial value, (b) a control unit for initiating a change of the blade pitch angle from the initial value to a first value by a predetermined first angle change in a first direction, (c) a data acquisition unit for receiving a measured value of a first power captured by the wind turbine, while the blade pitch angle has the first value, (d) a control unit for initiating a change of the blade pitch angle from the first value to a second value by a predetermined second angle change in a second direction being opposite to the first direction, and (e) a data acquisition unit for receiving a measured value of a second power captured by the wind turbine, while the blade pitch angle has the second value. The control system further comprises (f) a processing unit for calculating a power difference between the first power and the second power, and for determining the quality of the initial value based on the calculated power difference.

This further aspect of the invention is based on the idea that the above mentioned method of determining the quality of a current setting of the blade pitch angle can be controlled by the described control system, which can be easily implemented in a known wind turbine. Thereby, the known wind turbine can be easily converted into a new type of wind turbine, which may be adapted to carry out any embodiment of the above described method.

The described control system may be realized by means of a computer program respectively software. However, the control system may also be realized by means of one or more specific electronic circuits respectively hardware. Furthermore, the control system may also be realized in a hybrid form, i.e. in a combination of software modules and hardware modules.

Further, the different data acquisition units may be realized by means of a single control data acquisition unit. Accordingly, the different control units may be realized by means of a single control unit.

According to a further aspect of the invention there is provided a wind turbine for generating electric power. The wind turbine comprises (a) a propeller having at least one blade, wherein the propeller is rotatable around a rotational axis and the at least one blade extends radial with respect to the rotational axis, (b) a generator being mechanically coupled with the propeller, (c) a device for changing the blade pitch angle of the at least one blade, and (d) a control system as described above. Thereby, the control system is electrically coupled with the generator and with the device for changing the blade pitch angle.

This further aspect of the invention is based on the idea that by embedding the above described control system into a usual wind turbine, the wind turbine can be provided with the functionality to carry out the above described quality determining method, the above described optimized value determining method and/or the above described blade pitch angle adjustment method.

According to a further aspect of the invention there is provided a computer program for determining the quality of an initial value for a blade pitch angle of a wind turbine. The computer program, when being executed by a control system, is adapted for controlling any embodiment of the above described method.

The computer program element may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or other programmable device to carry out the intended functions. The computer program may be available from a network, such as the WorldWideWeb, from which it may be downloaded.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION OF INVENTION

The illustration in the drawing is schematically. It is noted that in different figures, similar or identical elements are provided with the same reference signs or with reference signs, which are different from the corresponding reference signs only within the first digit.

Figure 1:
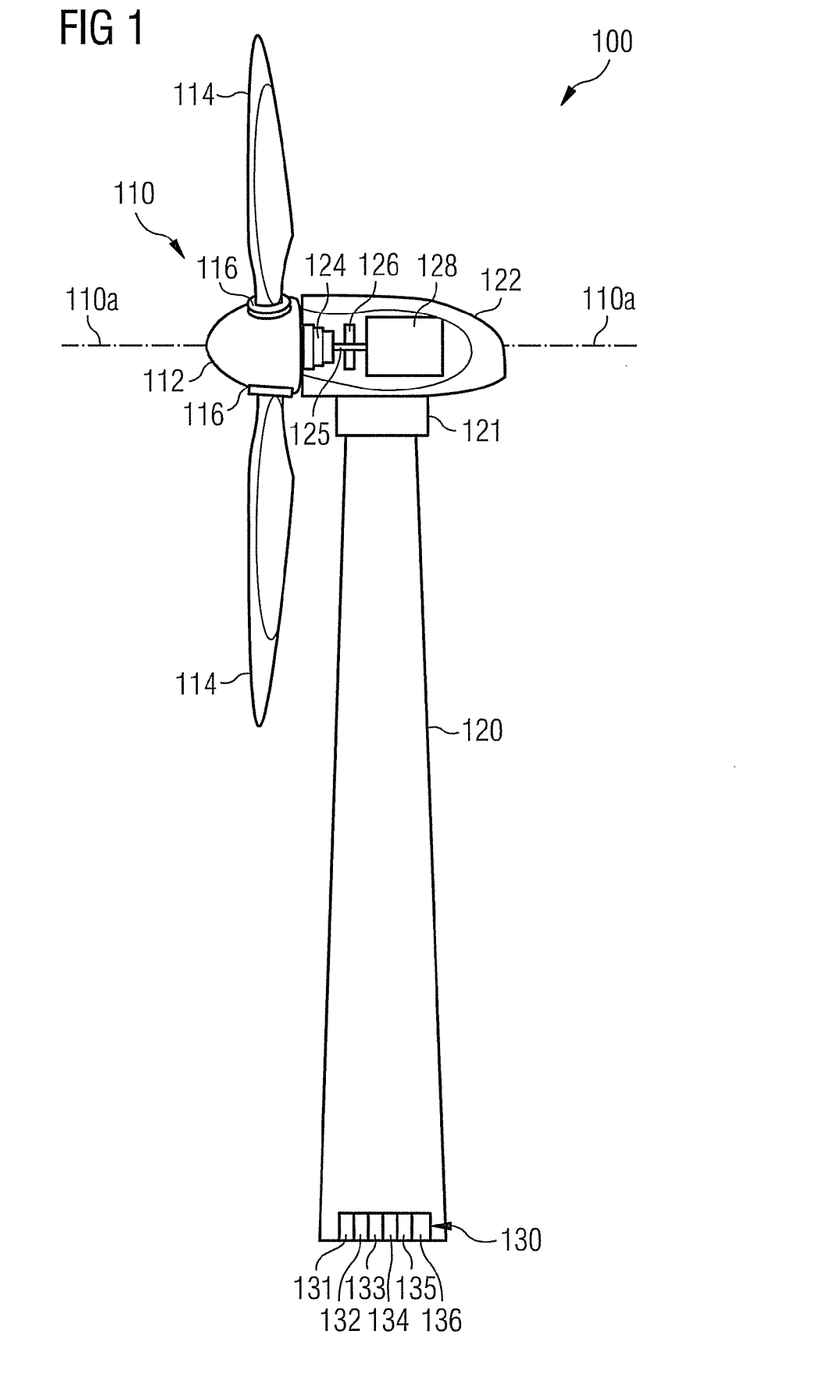
FIG. 1 shows a wind turbine comprising a control system for adjusting the blade pitch angle of propeller blades.

FIG. 1 shows a wind turbine 100 according to an embodiment of the invention. The wind turbine 100 comprises a mast 120, which is mounted on a non-depicted fundament. On top of the mast 120 there is arranged a housing 122. In between the mast 120 and the housing there is provided a propeller angle adjustment device 121, which is capable of rotating the housing 122 around a non depicted vertical axis, which is aligned with the longitudinal extension of the mast 120. By controlling the propeller angle adjustment device 121 in an appropriate manner it can be made sure, that during operation of the wind turbine 100 the housing 122 is always properly aligned with the current wind direction.

The wind turbine 100 further comprises a propeller 110 having three blades 114. In the perspective of FIG. 1 only two blades 114 are visible. The propeller 110 is rotatable around a rotational axis 110a. The blades 114, which are mounted at a driving collar 112, extend radial with respect to the rotational axis 110a. In between the driving collar 112 and a blade 114 there is respectively provided a blade adjustment device 116 in order to adjust the blade pitch angle of each blade 114 by rotating the respective blade around a non depicted axis being aligned parallel with the longitudinal extension of the blade 114. By controlling the blade adjustment device 116 the blade pitch angle of the respective blade 114 can be adjusted in such a manner, that depending on the current wind conditions a maximum wind power can be retrieved from the available wind power.

As can be seen from FIG. 1, within the housing there is provided a gear box in order to convert the number of revolutions of the propeller 110 into a higher number of revolutions of a shaft 125, which is coupled in a known manner to a generator 128. Further, a brake 126 is provided in order to stop the operation of the wind turbine 100 for instance in case of an emergency and/or in case of strong wind conditions, which might harm the wind turbine 100.

The wind turbine 100 further comprises a control system 130 for operating the wind turbine 100 in a highly efficient manner. Apart from controlling for instance the propeller angle adjustment device 121 the depicted control system 130 is also used for adjusting the blade pitch angle of the propeller blades 114 in an optimized manner. Before carrying out the blade pitch angle adjustment procedure the control system 130 determines the quality of an initial value for the blade pitch angles of the three blades 114.

In order to determine the quality of the initial value for the blade pitch angle the control system 130 comprises (a) a data acquisition unit 131 for receiving a measured value of a initial power captured by the wind turbine 100, while the blade pitch angle has the initial value, (b) a control unit 132 for initiating a change of the blade pitch angle from the initial value to a first value by a predetermined first angle change in a first direction, (c) a data acquisition unit 133 for receiving a measured value of a first power captured by the wind turbine 100, while the blade pitch angle has the first value, (d) a control unit 134 for initiating a change of the blade pitch angle from the first value to a second value by a predetermined second angle change in a second direction being opposite to the first direction, and a data acquisition unit 135 for receiving a measured value of a second power captured by the wind turbine 100, while the blade pitch angle has the second value.

Further, the control system 130 comprises a processing unit 136 for calculating a power difference between the first power and the second power, and for determining the quality of the initial value based on the calculated power difference. The processing unit 136 is further adapted for determining an optimized value for the blade pitch angle based on the initial value and on the calculated power difference. According to the embodiment described here the optimized value is reported to the blade adjustment device 116 in order to adjust the respective blade pitch angle to the optimized value.

Figure 2:
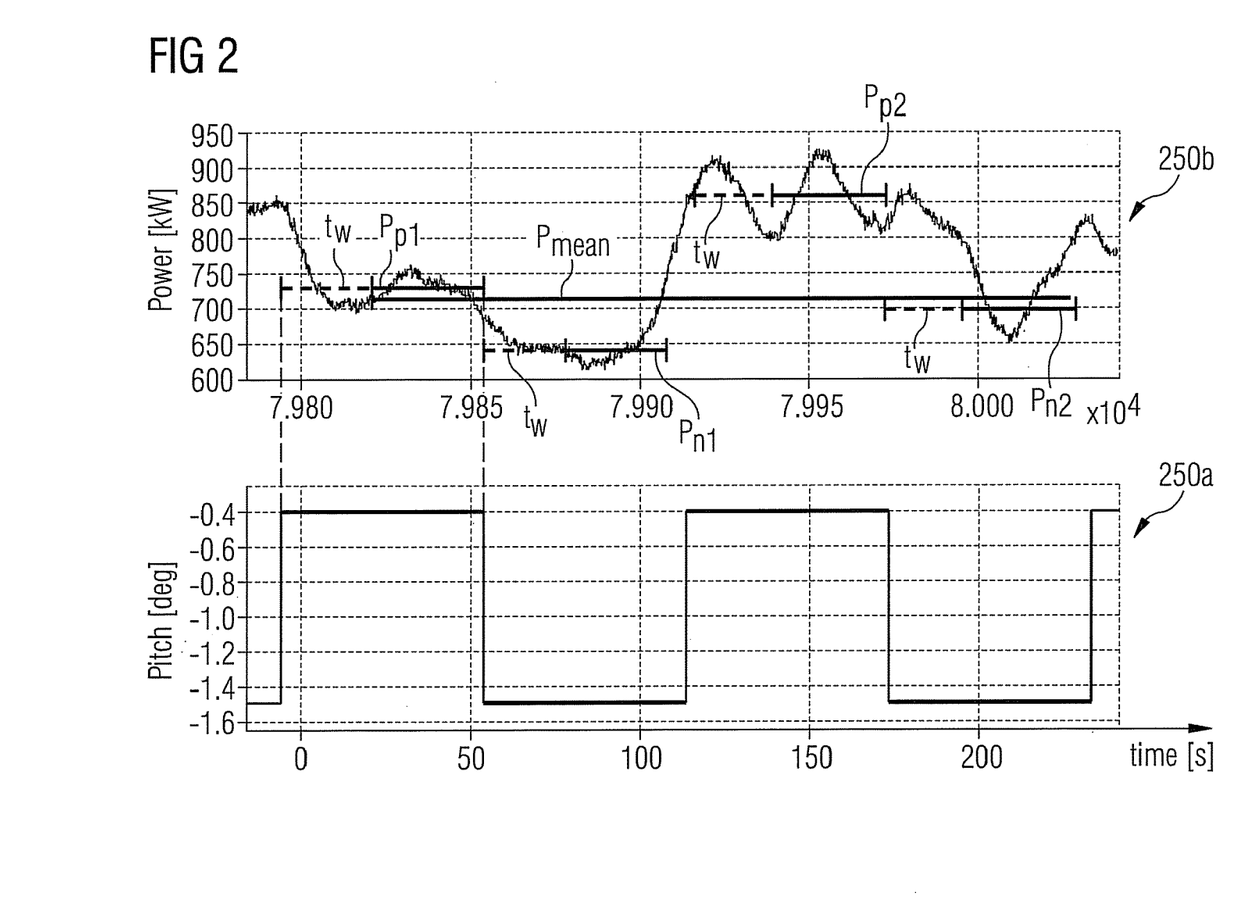
FIG. 2 shows a diagram illustrating an adaptive optimum blade pitch angle control.

FIG. 2 shows a diagram illustrating an adaptive optimum blade pitch angle control according to a preferred embodiment of the invention. In the lower coordinate system the blade pitch angle is depicted as a function of time. As can be seen, the blade pitch angle is changed every 60 seconds by +/−0.5 deg (step pitch angle). These step pitch angles are respectively added to an initial pitch angle. According to the embodiment described here this initial blade pitch angle is about −0.95 deg with respect to a reference blade pitch angle. The depicted variation of the pitch angle comprising the values −1.5 deg, −0.4 deg, −1.5 deg and −0.4 deg is called a step pitch cycle.

For the step pitch cycle, the averaged measured power for the positive step pitch state $P_{p1}$, $P_{p2}$ and the negative step pitch state $P_{n1}$, $P_{n2}$ is calculated. This is illustrated in the upper coordinate system of FIG. 2, wherein the captured wind power is depicted as a function of time. For each measurement process the first 30 seconds is omitted from the averages calculation, because the corresponding power values typically comprise large fluctuations due to a transient behavior of a dynamic inflow. The corresponding time intervals during which the measurement data are not taken into account are denominated with the reference numeral $t_w$. Since these time intervals $t_w$ start with the approach of a new blade pitch angle and end when the following averaging procedure begins, each of the time intervals $t_w$ represents a waiting time.

The power difference $P_d = P_p - P_n$ shows how optimal the initial blade pitch angle really is. If $P_d > 0$, on an angular scale the optimal blade pitch angle is in the positive direction. If $P_d < 0$, then on the angular scale the optimal blade pitch angle is in the positive direction. According to the embodiment described here the parameters $P_p$ and $P_n$, denominate the average of $P_{p1}$ and $P_{p2}$ and $P_{n1}$ and $P_{n2}$, respectively. Of course, if the step pitch cycle comprises a larger or a smaller number of blade pitch angle variations, the parameters $P_p$ and $P_n$ have to be adapted accordingly.

It is mentioned that from the values $P_{p1}$, $P_{p2}$, $P_{n1}$ and $P_{n2}$ the value of the optimum blade pitch angle can be calculated by means of a simple mathematical interpolation process. It is also possible to determine the value of the optimum blade pitch angle by comparing only at least one of the values $P_{p1}$, $P_{p2}$, $P_{n1}$, and $P_{n2}$ with a mean average captured power $P_{mean}$ for the whole step pitch cycle.

Figure 3:
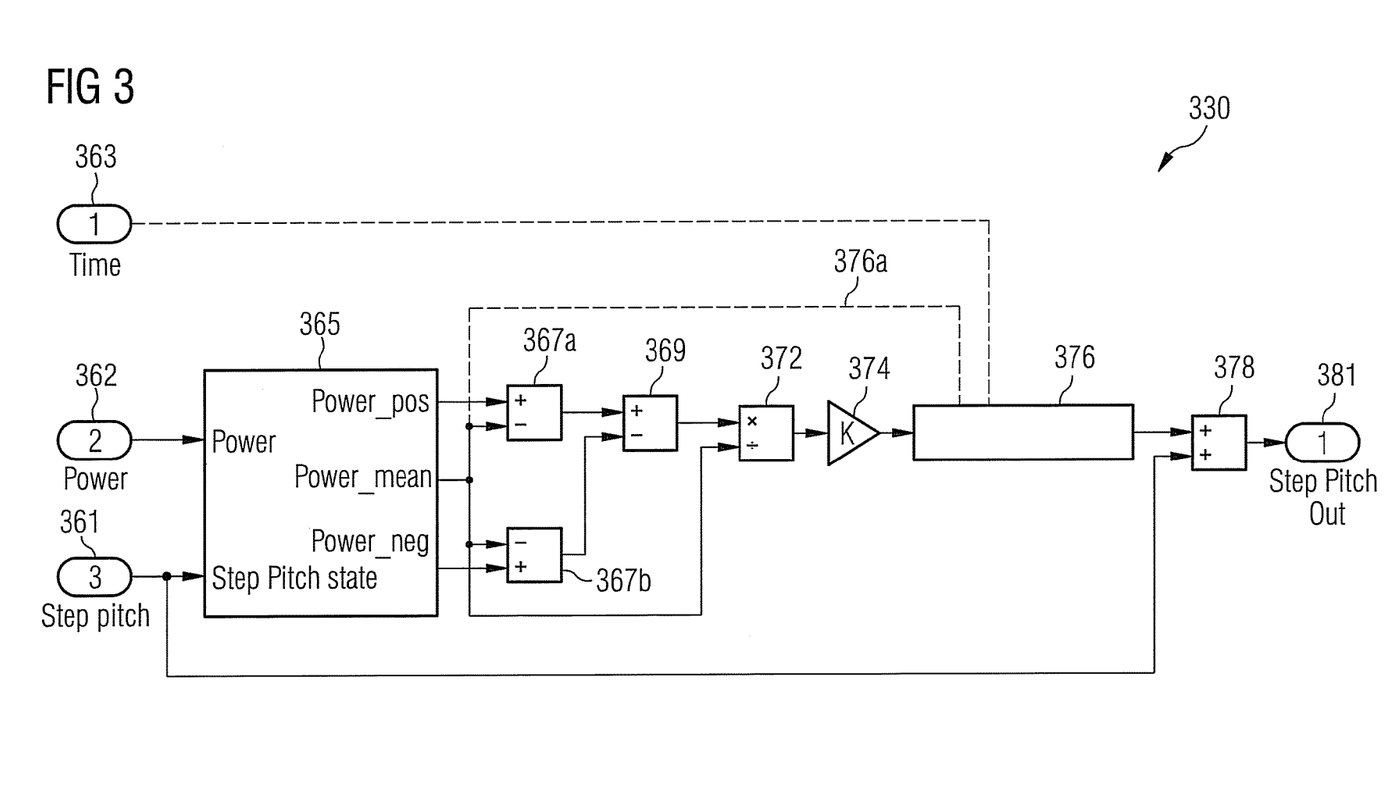
FIG. 3 shows a logical circuit diagram depicting control system for adjusting the blade pitch angle in accordance with the invention.

FIG. 3 shows a logical circuit diagram depicting a control system 330 for adjusting the blade pitch angle in accordance with the invention. The control system 330 comprises three input nodes, a step pitch angle input 361, a captured power input 362 and a time input 363.

As can be seen from FIG. 3 the value being indicative for the captured power and a value being indicative for the current step pitch angle is fed in a average filtering and switch unit 365. This unit 365 provides three output values, a value Power_pos representing the average captured power during a positive step pitch, a value Power_neg representing the average captured power during a negative step pitch and a value Power_mean representing the mean average captured power for the whole step pitch cycle. These three values are fed to two subtractor units 367a and 367b, the output signals of which are provided to a further subtractor unit 369.

Downstream with respect to the further subtractor unit 369 there is provided a divider unit 372 and an amplifier 374. An output signal of the amplifier 374 is delivered to an indexed integrator 376, which also receives a time input signal from the time input node 363. The indexed integrator 376 provides an output signal, which together with the signal being applied to the step pitch angle input node 361 is fed to an adder unit 378, which itself provides the signal for a step pitch angle output node 381.

As can be seen from FIG. 3, the power difference $P_d$ is calculated online and used in a close loop control, which integrates the values of $P_d$ up to an optimized optimum pitch angle. The corresponding feedback loop is denominated with reference numeral 376a.

According to the embodiment described here the integration is carried out in a multiple dimensional way, where the time of the day represents a further parameter for the described blade pitch angle optimization process. It is mentioned that in addition or alternatively to the time of the day other dimensions such as for instance the yaw angle, the temperature, the season of the year and/or the wind shear can be added to the described blade pitch angle optimization procedure.

According to the embodiment described here the indexed integrator 376 will adapt the different conditions and adjust the optimum pitch angle as a function of the time of the day. The indexed integrator 376 calculates an optimum blade pitch angle by applying the following formula:

$$\Theta_{opt\_new}(ix_{pwr}, ix_{time}) == \text{saturate}\left[\begin{array}{c} \Theta_{opt\_old}(ix_{pwr}, ix_{time}) + (P_{dmax} < |P_d|) \cdot \\ \frac{K_i \cdot P_{nom}}{\frac{60}{2} \cdot 24} \cdot \frac{P_d}{P_{mean}}, \Theta_{opt\_min}, \Theta_{opt\_max} \end{array}\right] \quad (1)$$

Thereby, $\Theta_{opt\_new}$ is the new optimum blade pitch angle and $\Theta_{opt\_old}$ is the old blade pitch angle, which both depend on the power index $ix_{pwr}$ and on the time index $ix_{time}$.

The power index, which is also called a power dimension, is given by $$ix_{pwr} = \text{round}\left(N \cdot \frac{P_{nom}}{P_{mean}}\right),$$

wherein $P_{nom}$ is the nominal power and N is the number of the bin-sectors for the power provided by the wind turbine. Thereby, the number of the bin-sectors is a measure for the resolution in the power dimension. The higher N is, the larger is the resolution. For instance if N=10, a provided power between 0 and 10% of the nominal power $P_{nom}$ is assigned to the first bin-sector, a provided power between 10 and 20% of $P_{nom}$ is assigned to the second bin-sector and so on.

The time index, which is also called a time dimension, is given by $ix_{time} = (\text{time} > \text{time}_{day})^{\wedge} \text{time} < \text{time}_{night})$.

$P_{d\,max}$ is the maximum power difference. If the difference power is larger than this value, the integrator step will be skipped.

$P_d = P_p - P_n$ is the power difference between the above mentioned average captured power during a positive step pitch $P_p$ and the average captured power during a negative step pitch $P_n$.

saturate [x, min, max] is the saturation function. This function limits the input value x to the min and max values.

$K_i$ is the integrator gain. Its unit is deg/$P_{nom}$/day.

$$P_{mean} = \frac{P_p + P_n}{2}$$

$\Theta_{opt\_min}$ and $\Theta_{opt\_max}$ is a minimum respectively a maximum limit for the optimal pitch reference.

It has to be mentioned that the expression ($P_{d\,max} < |P_d|$) is an abbreviated representation for a case differentiation. Specifically, ($P_{d\,max} < |P_d|$) takes the value 1 if the condition given in the brackets is true and takes the value 0 if this condition is not true.

Figure 4:
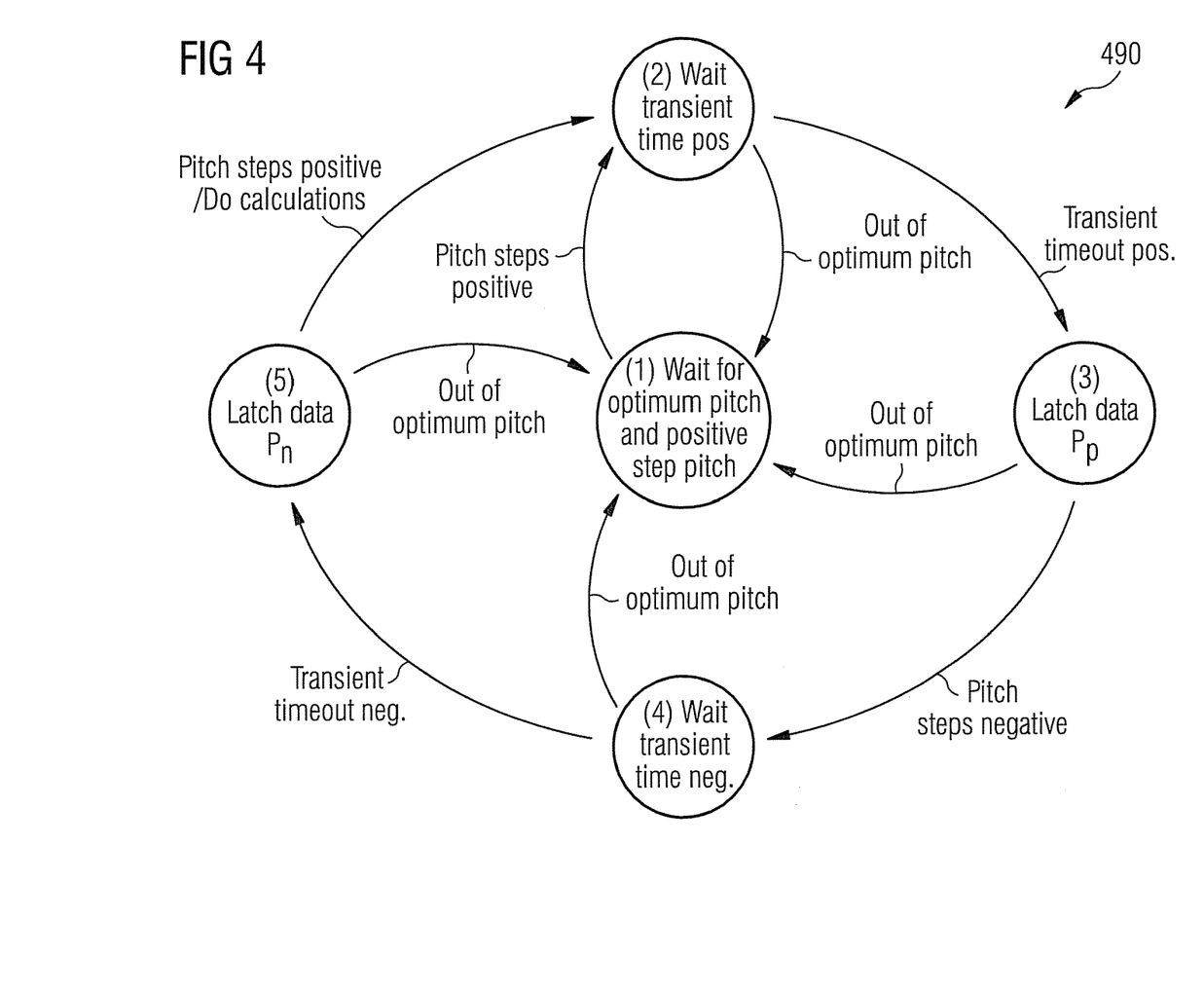
FIG. 4 shows a diagram depicting operational states and process steps of a control system, which is controlling a blade pitch angle adjustment.

The optimal pitch reference is calculated by an interpolation between the data points in $\Theta_{opt\_old}(ix_{pwr}, ix_{time})$ FIG. 4 shows a diagram 490 depicting operational states of a control system and the corresponding process steps of a method for controlling a blade pitch angle adjustment. The diagram 490 can also be interpreted as the graphical representation of a state machine 490, which is capturing and handling data and which is sampling various calculations.

After a turbine controller startup the state machine 490 will start in a first state (1), wherein it waits for an initial optimum pitch and a positive step pitch.

After carrying out the positive step pitch the state machine 490 will arrive at a second state (2). Therein it will wait until transient responses respectively the above described waiting time are over.

If during this waiting time the blade pitch angle has moved away from the optimal pitch angle, the state machine 490 will go back to state (1). If this is not the case, the state machine 490 will arrive at the state (3), wherein the captured power is measured and the measured power values are averaged. Thereby, the average captured power $P_p$ during the positive step is latched.

Next, if for instance the average captured power $P_p$ reveals, that the blade pitch angle has moved away from the optimal pitch angle, the state machine 490 will go back to state (1). If this is not the case a negative step pitch is carried out and the state machine 490 will arrive at a state (4). In this state (4) the state machine 490 will remain until again a transient response is over. It is supposed that this is the case when again the above mentioned waiting time is over.

Next, if during this waiting time the blade pitch angle has moved away from the optimal pitch angle, the state machine 490 will go back to state (1). If this is not the case and when receiving a timeout message for the waiting time the state machine 490 will arrive at a state (5), wherein the captured power is measured and the measured power values are averaged. Thereby, the average captured power $P_n$ during the negative step is latched.

Again, if for instance the average captured power $P_n$ reveals, that the blade pitch angle has moved away from the optimal pitch angle, the state machine 490 will go back to state (1). If this is not the case a positive step pitch is carried out. Further, the calculations as described above with reference to FIG. 3 and in particular the values for $P_p$, $P_n$, $P_{mean}$ and $P_d$ are calculated. Then, the state machine 490 will again arrive at the state (2), wherein it is awaited for the waiting time to go past.

Figure 5:
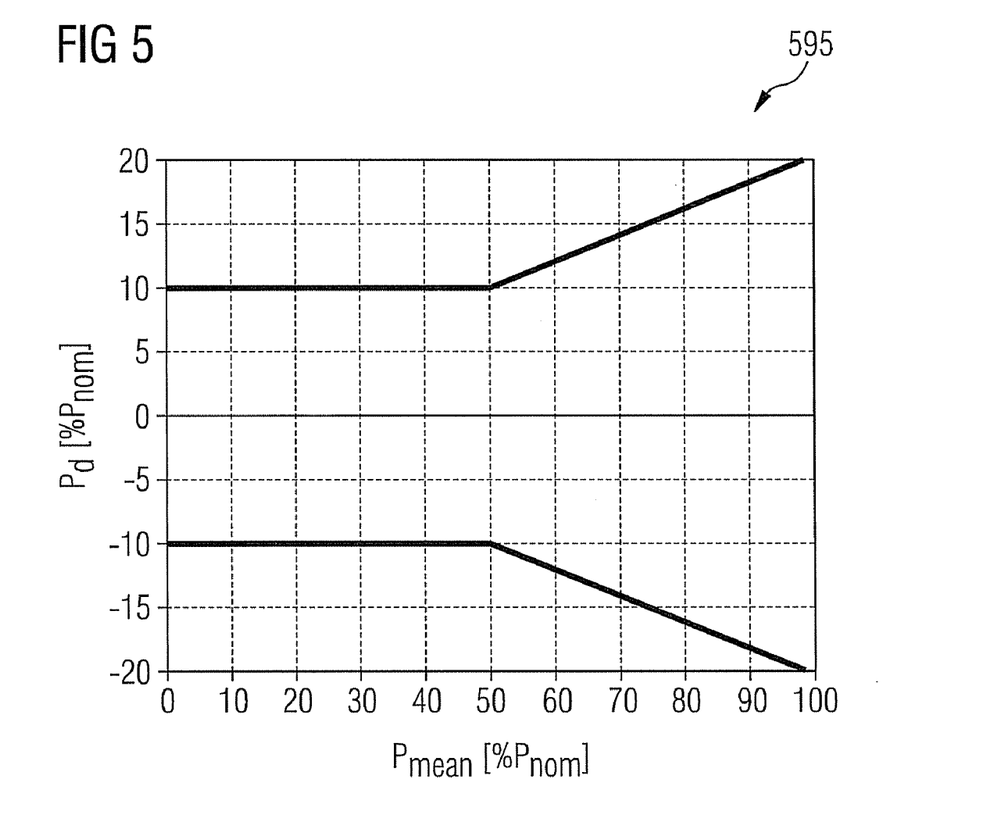
FIG. 5 shows a diagram illustrating a preferred dependency of a corridor of power difference from a mean power, wherein only power differences being located within the corridor are taken into account for calculating an optimized blade pitch angle and for adjusting the blade pitch angle.

FIG. 5 shows a diagram 595 illustrating a preferred dependency of a corridor of power difference from a mean power, wherein only power differences being located within the corridor are taken into account for calculating an optimized blade pitch angle and for adjusting the blade pitch angle. In other words, there is a limitation for the calculated values of $P_d$. If the calculated value of $P_d$ is out of the corridor described by the two solid lines in FIG. 5, the above described integrator step of the blade pitch angle optimization procedure will be skipped.

According to the embodiment described here the width of the corridor is not constant but depends on the mean average captured power $P_{mean}$ for whole step pitch cycle. However, for comparatively small values of $P_{mean}$ being smaller than 50% of the nominal power $P_{nom}$ of the wind turbine, power differences $P_d$ up to +/−10% with respect to the nominal power $P_{nom}$ are considered to be based on error free measurements. For larger values of $P_{mean}$ being larger than 50% of the nominal power $P_{nom}$ of the wind turbine, the width of the corridor continuously increases with the value of $P_{mean}$. This means that for larger values of the mean average captured power $P_{mean}$ for whole step pitch cycle larger power differences $P_d$ are considered to be rely on error free measurements.

By using the described corridor potential misleading trends, which might be caused for instance by a slow but large change of the wind speed, can be filtered out from the described blade pitch angle optimization procedure.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. Method of determining quality of an initial value for a blade pitch angle of a wind turbine, comprising:
    measuring an initial power captured by the wind turbine, while the blade pitch angle has the initial value;
    changing the blade pitch angle from the initial value to a first value by a predetermined first angle change in a first direction;
    measuring a first power captured by the wind turbine, while the blade pitch angle has the first value;
    changing the blade pitch angle from the first value to a second value by a predetermined second angle change in a second direction being opposite to the first direction;
    measuring a second power captured by the wind turbine, while the blade pitch angle has the second value;
    calculating a power difference between the first power and the second power; and
    determining the quality of the initial value based on the calculated power difference,
    wherein
        measuring the initial power comprises an averaging process within an initial time interval,
        measuring the first power comprises an averaging process within a first time interval, and
        measuring the second power comprises an averaging process within a second time interval, and
    wherein
        the first time interval starts after an elapse of a predetermined first waiting time following an approach of first value, and
        the second time interval starts after an elapse of a predetermined second waiting time following an approach of second value.

2. The method as claimed in claim 1, further comprising:
    determining an optimized value for the blade pitch angle based on the initial value and on the calculated power difference.

3. The method as claimed in claim 2, wherein determining the optimized value for the blade pitch angle further takes into account
    a first difference between the first value and the initial value, and
    a second difference between the initial value and the second value.

4. The method as claimed in claim 3, wherein the first difference is the same as the second difference.

5. The method as claimed in claim 4, further comprising:
    adjusting the blade pitch angle to the optimized value.

6. The method as claimed in claim 5, wherein the step of determining the optimized value is only carried out when the calculated power difference is smaller than a predefined threshold.

7. The method as claimed in claim 3, further comprising:
    adjusting the blade pitch angle to the optimized value.

8. The method as claimed in claim 3, wherein the step of determining the optimized value is only carried out when the calculated power difference is smaller than a predefined threshold.

9. The method as claimed in claim 2, further comprising:
    adjusting the blade pitch angle to the optimized value.

10. The method as claimed in claim 2, wherein the step of determining the optimized value is only carried out when the calculated power difference is smaller than a predefined threshold.

11. The method as claimed in claim 10, wherein the predefined threshold is a non uniform function of the power captured by the wind turbine.

12. Control system for determining quality of an initial value for a blade pitch angle of a wind turbine, comprising:
    a first data acquisition unit for receiving a measured value of a initial power captured by the wind turbine, while the blade pitch angle has the initial value;
    a first control unit for initiating a change of the blade pitch angle from the initial value to a first value by a predetermined first angle change in a first direction;
    a second data acquisition unit for receiving a measured value of a first power captured by the wind turbine, while the blade pitch angle has the first value;
    a second control unit for initiating a change of the blade pitch angle from the first value to a second value by a predetermined second angle change in a second direction being opposite to the first direction;
a third data acquisition unit for receiving a measured value of a second power captured by the wind turbine, while the blade pitch angle has the second value; and
a processing unit
for calculating a power difference between the first power and the second power, and
for determining the quality of the initial value based on the calculated power difference,
wherein
a measuring of the initial power comprises an averaging process within an initial time interval,
a measuring of the first power comprises an averaging process within a first time interval, and
a measuring of the second power comprises an averaging process within a second time interval, and
wherein
the first time interval starts after an elapse of a predetermined first waiting time following an approach of first value, and
the second time interval starts after an elapse of a predetermined second waiting time following an approach of second value.

13. A wind turbine for generating electric power, comprising:
a propeller including a blade, the propeller being rotatable around a rotational axis and the blade extending radial with respect to the rotational axis;
a generator being mechanically coupled with the propeller;
a device for changing a blade pitch angle of the blade; and
a control system electrically coupled with the generator and with the device for changing the blade pitch angle, the control system comprising:
a first data acquisition unit for receiving a measured value of a initial power captured by the wind turbine, while the blade pitch angle has the initial value;
a first control unit for initiating a change of the blade pitch angle from the initial value to a first value by a predetermined first angle change in a first direction;
a second data acquisition unit for receiving a measured value of a first power captured by the wind turbine, while the blade pitch angle has the first value;
a second control unit for initiating a change of the blade pitch angle from the first value to a second value by a predetermined second angle change in a second direction being opposite to the first direction;
a third data acquisition unit for receiving a measured value of a second power captured by the wind turbine, while the blade pitch angle has the second value; and
a processing unit for calculating a power difference between the first power and the second power, and for determining the quality of the initial value based on the calculated power difference,
wherein
a measuring of the initial power comprises an averaging process within an initial time interval,
a measuring of the first power comprises an averaging process within a first time interval, and
a measuring of the second power comprises an averaging process within a second time interval, and
wherein
the first time interval starts after an elapse of a predetermined first waiting time following an approach of first value, and
the second time interval starts after an elapse of a predetermined second waiting time following an approach of second value.

* * * * *